US012221833B2

(12) United States Patent
Wang

(10) Patent No.: US 12,221,833 B2
(45) Date of Patent: Feb. 11, 2025

(54) ADJUSTABLE HEAD RAIL DEVICE OF CORDLESS ROLLER BLIND

(71) Applicant: Zhejiang Risingsun Sunshading Technology Co., Ltd., Shaoxing (CN)

(72) Inventor: Haiyan Wang, Shaoxing (CN)

(73) Assignee: Zhejiang Risingsun Sunshading Technology Co., Ltd., Shaoxing (CN)

( * ) Notice: Subject to any disclaimer, the term of this patent is extended or adjusted under 35 U.S.C. 154(b) by 302 days.

(21) Appl. No.: 17/935,580

(22) Filed: Sep. 27, 2022

(65) Prior Publication Data

US 2023/0417105 A1 Dec. 28, 2023

(30) Foreign Application Priority Data

Jun. 22, 2022 (CN) ......................... 202210712607.7

(51) Int. Cl.
*E06B 9/60* (2006.01)
*E06B 9/42* (2006.01)

(52) U.S. Cl.
CPC . *E06B 9/60* (2013.01); *E06B 9/42* (2013.01)

(58) Field of Classification Search
CPC ..... E06B 9/40; E06B 9/42; E06B 9/60; E06B 9/56; E06B 9/62; E06B 9/80; E06B 9/82; E06B 9/88; E06B 9/90; E06B 2009/807; E06B 2009/905
See application file for complete search history.

(56) References Cited

U.S. PATENT DOCUMENTS 208,417 A * 9/1878 Noyes ........................ E06B 9/60 24/115 R
260,044 A * 6/1882 Osgood ...................... E06B 9/60 160/317
260,045 A * 6/1882 Osgood ...................... E06B 9/60 160/313
281,480 A * 7/1883 Fillmore ................... E06B 9/60 160/306
310,557 A * 1/1885 Buckley .................... E06B 9/90 160/301

(Continued)

FOREIGN PATENT DOCUMENTS

CN 201129116 Y 10/2008
CN 101545350 A 9/2009
CN 101550800 A 10/2009

*Primary Examiner* — Johnnie A. Shablack

(74) *Attorney, Agent, or Firm* — True Shepherd LLC; Andrew C. Cheng

(57) ABSTRACT

An adjustable head rail device of a spring assisted cordless roller blind includes a spring and a limiting assembly, the spring is indirectly connected to a roller blind fabric to provide the roller blind fabric with a pulling force that balances its own gravity; the limiting assembly abuts against a middle portion of the spring, and the limiting assembly applies a radial pressure to the spring, so that the abutted portion of the spring is converted from an elastic member to a rigid member, and is not elastically deformable; the limiting assembly is movable in an axial direction of the spring to adjust a position of the abutted portion of the spring, which can realize an adjustable working length of the spring arranged in the head rail device, and can adapt to the roller blinds with different widths, materials and lengths, with a wide application range.

9 Claims, 11 Drawing Sheets

(56) References Cited

U.S. PATENT DOCUMENTS

| | | | | | |
|---|---|---|---|---|---|
| 422,314 | A * | 2/1890 | Peters | E06B 9/90 | 160/292 |
| 700,951 | A * | 5/1902 | Leach | E06B 9/90 | 160/292 |
| 748,641 | A * | 1/1904 | Newell | E06B 9/60 | 160/315 |
| 835,599 | A * | 11/1906 | Cahill | E06B 9/62 | 160/242 |
| 1,416,071 | A * | 5/1922 | Smurr | E06B 9/60 | 160/189 |
| 1,641,506 | A * | 7/1927 | Smurr | E06B 9/60 | 160/315 |
| 1,795,390 | A * | 3/1931 | Graystone | E06B 9/82 | 160/301 |
| 2,038,523 | A * | 4/1936 | Cahill | E06B 9/60 | 160/235 |
| 2,350,286 | A * | 5/1944 | Michelman | E06B 9/60 | 160/315 |
| 2,924,411 | A * | 2/1960 | Rouverol | F16F 15/28 | 248/572 |
| 4,102,384 | A * | 7/1978 | Gossling | E06B 9/171 | 160/263 |
| 4,429,729 | A * | 2/1984 | Winslow | E06B 9/60 | 185/43 |
| 6,467,714 | B1 * | 10/2002 | Rasmussen | E06B 9/44 | 242/381 |
| 7,228,797 | B1 | 6/2007 | Hillman et al. | | |
| 8,739,853 | B2 | 6/2014 | Judkins | | |
| 9,890,583 | B2 | 2/2018 | Marocco | | |
| 10,934,775 | B2 * | 3/2021 | Zhang | E06B 9/322 | |
| 11,306,535 | B2 * | 4/2022 | Lu | E06B 9/56 | |
| 11,339,608 | B2 * | 5/2022 | Norton | E06B 9/42 | |
| 11,634,945 | B2 * | 4/2023 | Taubenrauch | E06B 9/90 | 160/309 |
| 11,834,905 | B2 * | 12/2023 | Schorling | E06B 9/90 | |
| 2020/0157883 | A1 * | 5/2020 | Ng | E06B 9/60 | |
| 2023/0313608 | A1 * | 10/2023 | Lin | E06B 9/90 | 160/313 |
| 2023/0340834 | A1 * | 10/2023 | Schmick | E06B 9/50 | |

* cited by examiner

ADJUSTABLE HEAD RAIL DEVICE OF CORDLESS ROLLER BLIND

CROSS-REFERENCE TO RELATED APPLICATIONS

This application claims priority to Chinese Patent Application No. 202210712607.7 with a filing date of Jun. 22, 2022. The content of the aforementioned application, including any intervening amendments thereto, is incorporated herein by reference.

FIELD

The present application relates to the technical field of daily necessities, and in particular to an adjustable head rail device of a spring assisted cordless roller blind.

BACKGROUND

In order to solve the problem that a cord in a cord roller blind is easily damaged and easily causes children to suffocate, a cordless roller blind appears in the market. The elastic potential energy of a torsion spring is utilized by the cordless roller blind to balance the gravitational potential energy of a roller blind fabric. For example, the spring-type cordless automatic design with the patent number of CN200720049234.0 is to design a long spring with one fixed end and another movable end. When the roller blind is pulled down and hung down, a tube body rotates to drive one end of the spring to rotate, to tighten the spring. The restoring force of the spring can push the tube body to rotate back and wind up the cord. According to the elasticity of the spring and in a case that the restoring force of the spring is equal to the gravity of the roller blind, the roller blind can be moved up and down freely, that is, the roller blind can be automatically rolled without pulling the cord.

However, this arrangement also brings many problems. In order to match the needs of windows, the length and width of the roller blind are not standard. Windows of different heights and widths need to match roller blinds of their own size, so the length and width of the roller blind fabric are also different. In addition, in order to meet the shading needs of different customers, the roller blind fabric can be made of different materials to adjust the light transmittance; so the grammage per unit area of the roller blind fabric is different. The elastic potential energy generated by the tightening of spring is used by the spring-type cordless automatic roller blind to balance the gravitational potential energy of the pulled roller blind. Since the length, width and material of the roller blind fabrics of different roller blinds are different, the elastic potential energy to be balanced is also different even if the roller blind fabrics are pulled down by the same length. Therefore, in the design of the spring-type cordless automatic roller blind, it is often necessary to use different springs to match different roller blind fabrics, so various non-standard springs appear, which increases the design cost, production cost, packaging cost, transportation cost and sales difficulty of the enterprise.

Therefore, a head rail device that can adjust its own elastic potential energy is required to solve the above problems.

SUMMARY

The technical problem to be solved by the present application is to provide an adjustable head rail device of a spring assisted cordless roller blind, which can realize an adjustable working length of the spring arranged in the head rail device of the spring assisted cordless roller blind, and can adapt to roller blinds with different widths, materials and lengths with a wide application range.

An adjustable head rail device of a spring assisted cordless roller blind according to the present application includes a spring and a limiting assembly;

- the spring is indirectly connected to a roller blind fabric to provide the roller blind fabric with a pulling force that balances its own gravity;
- the limiting assembly abuts against a middle portion of the spring, and the limiting assembly is configured to apply a radial pressure to the spring, so that the abutted portion of the spring is converted from an elastic member to a rigid member, and is not elastically deformable;
- the limiting assembly is movable in an axial direction of the spring to adjust a position of the abutted portion of the spring.

As a further improvement of the present application, the limiting assembly is located inside the spring, and the limiting assembly abuts against an inner wall of the spring to provide a support force for the spring.

As a further improvement of the present application, the limiting assembly is made of a rigid material, so that an outer diameter of the limiting assembly is constant; and the outer diameter of the limiting assembly is smaller than an inner diameter of the spring in a free state.

As a further improvement of the present application, the adjustable head rail device of the spring assisted cordless roller blind further includes a long shaft, and the long shaft is made of a rigid material; the spring is sleeved outside the long shaft; the limiting assembly is sleeved outside the long shaft and is slidably connected with the long shaft.

As a further improvement of the present application, a connecting hole is defined on a side, close to a movable end of the spring, of the long shaft, the connecting hole extends through the long shaft, and an adjusting rope is movably connected in the connecting hole, and the adjusting rope is connected end to end in a ring shape; a side, close to a fixed end of the spring, of the long shaft is provided with a positioning plug adjusting member; the adjusting rope is directed through the connecting hole, is arranged along a length direction of the long shaft and is sleeved outside the positioning plug adjusting member; the positioning plug adjusting member is configured to control the adjusting rope to be movable along the length direction of the long shaft; and the adjusting rope is fixedly connected with the limiting assembly, so that the limiting assembly is indirectly driven by the positioning plug adjusting member.

As a further improvement of the present application, a graduated outer tube is sleeved outside the spring, the graduated outer tube is made of transparent material, and an outer surface of the graduated outer tube is marked with graduations that cover a full length of the spring.

As a further improvement of the present application, a side, movably connected to the spring, of the long shaft is connected with a foot-hanging end cover, the foot-hanging end cover includes a foot-hanging end cover head and a foot-hanging end cover rod, an open cavity is defined inside the foot-hanging end cover rod, a size of the cavity is matched with a size of a cross section of the long shaft, so that the foot-hanging end cover rod is fitted and connected with the long shaft; a spring movable inner sleeve is sleeved on an outer surface of the foot-hanging end cover head, the spring movable inner sleeve is connected with one end of the spring, so that the spring torsion is pre-tightened when the spring movable inner sleeve is rotated; the spring movable inner sleeve is movably connected with the foot-hanging end cover, so that the foot-hanging end cover rotates independent of the spring movable inner sleeve.

As a further improvement of the present application, the adjustable head rail device of the spring assisted cordless roller blind includes a brake pull ring, and the brake pull ring is annular; one side of the brake pull ring is provided with a clamping member; multiple clamping grooves are defined on an upper surface of the spring movable inner sleeve, a size of each clamping groove is the same as a size of the clamping member; a clamping opening is defined on a lower surface of the foot-hanging end cover head, a size of the clamping opening is the same as the size of the clamping member, and the clamping opening corresponds to the clamping groove in position; the clamping member is matched and connected with the clamping groove, and the clamping opening is matched and connected with the clamping member to limit a position of the spring movable inner sleeve.

As a further improvement of the present application, the adjustable head rail device of the spring assisted cordless roller blind further includes a torque adjusting assembly; the torque adjusting assembly is directly or indirectly connected with one end of the spring; the torque adjusting assembly is configured to be rotatable around an axis of the spring to tighten the spring; the torque adjusting assembly is not directly or indirectly connected with the roller blind fabric when the torque adjusting assembly tightens the spring, to be independent of the ascending and descending of the roller blind fabric.

As a further improvement of the present application, the torque adjusting assembly includes a torque foot-hanging end cover, an active adjusting wheel and a passive adjusting wheel;

- a side, movably connected to the spring, of the long shaft is connected with the torque foot-hanging end cover, the foot-hanging end cover includes a torque foot-hanging end cover head, a torque foot-hanging end cover body and a torque foot-hanging end cover rod, an open cavity is defined inside the torque foot-hanging end cover rod, and a size of the cavity is matched with a size of a cross section of the long shaft, so that the torque foot-hanging end cover rod is fitted and connected with the long shaft;
- a torsion spring is mounted on an outer surface of the torque foot-hanging end cover body, and is tightly connected with an outer circumference of the torque foot-hanging end cover in an expansion manner;
- the active adjusting wheel is sleeved outside the torsion spring, and is fixedly connected with two ends of the torsion spring, the active adjusting wheel is rotated during working to loosen the torsion spring and separate the torsion spring from the torque foot-hanging end cover; and
- the passive adjusting wheel is sleeved outside the active adjusting wheel, and the passive adjusting wheel rotates in a same direction with the rotation of the active adjusting wheel; another cavity is defined in a lower end of the passive adjusting wheel, and a size of the another cavity is the same as the size of the cross section of the long shaft, so that the another cavity is fitted and connected with the long shaft.

Compared with the conventional technology, the beneficial effects of the present application are that: the freely movable limiting assembly is arranged on the long shaft, and the working length of the spring changes when the inner limiting assembly moves, so that the working length of the spring arranged in the head rail device of the spring assisted cordless roller blind is adjustable, which can adapt to the roller blinds of different widths, lengths and materials with a wide range of applications.

The graduated outer tube is sleeved outside the spring, the working length of the spring can be visually seen through the graduated outer tube, and the user can adjust the working length of the spring according to the table provided by the manufacturer, so as to adapt to the roller blinds of different widths and materials, which is convenient to use.

The adjusting rope is fixedly connected with a lining positioning plug, and a position of the lining positioning plug can be changed by rotating the adjusting rope, which is convenient to use.

The brake pull ring restricts the rotation of the foot-hanging end cover, which can keep the spring in a pre-tightened state, and is convenient for the assembly of the roller blind.

The active adjusting wheel is fixedly connected with the torsion spring, the torsion spring is loosened when the active adjusting wheel is rotated, and the active adjusting wheel rotates to indirectly rotate the long shaft, thereby changing the tightening degree of the spring without driving the foot-hanging end cover to rotate, which is convenient to tighten the spring without affecting the rotation of the roller blind after a period of use, prevents the spring from being unable to return to the original state after being fatigued due to long-term use, thus affecting the use of the roller blind; when the active adjusting wheel is adjusted, the passive adjusting wheel is rotated to rotate the spring movable inner sleeve, and the torsion spring is tightened or loosened, so that the roller blind operates in the best state.

DETAILED DESCRIPTION OF THE EMBODIMENTS

Figure 1:
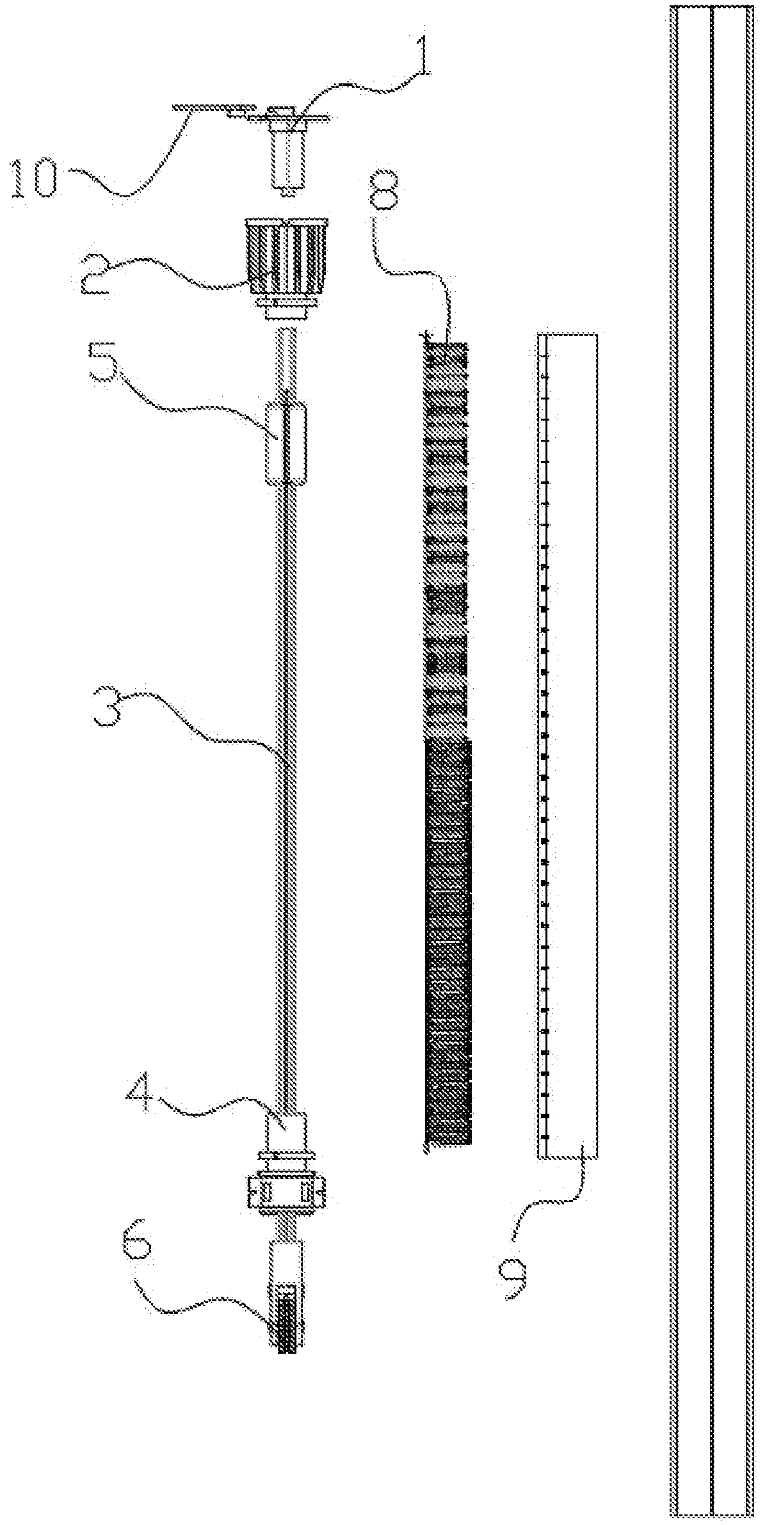
FIG. 1 is a perspective exploded view of a first embodiment of the present application.
Figure 2:
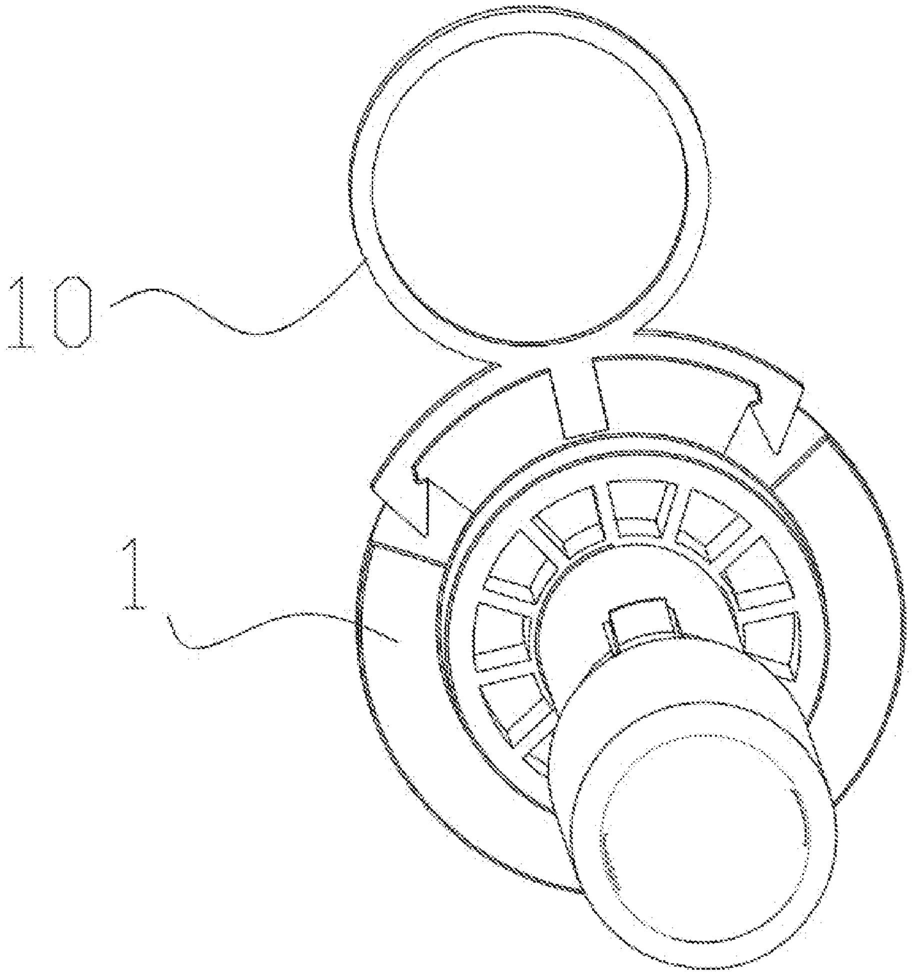
FIG. 2 is a schematic view showing a connection structure between a foot-hanging end cover and a brake pull ring according to the first embodiment of the present application.
Figure 3:
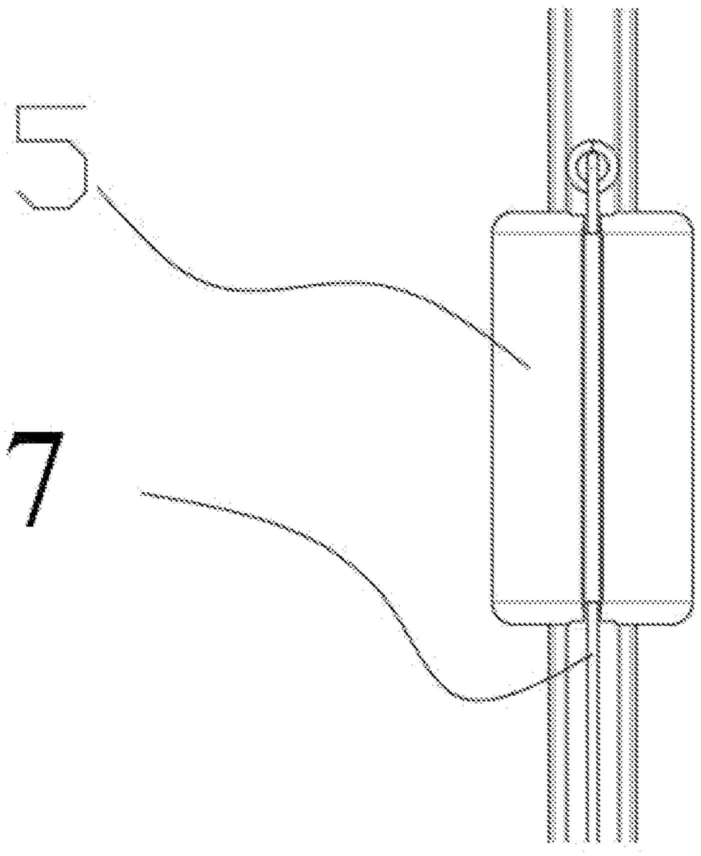
FIG. 3 is a schematic structural view showing a connection between an adjusting rope and a lining positioning plug according to the present application.
Figure 4:
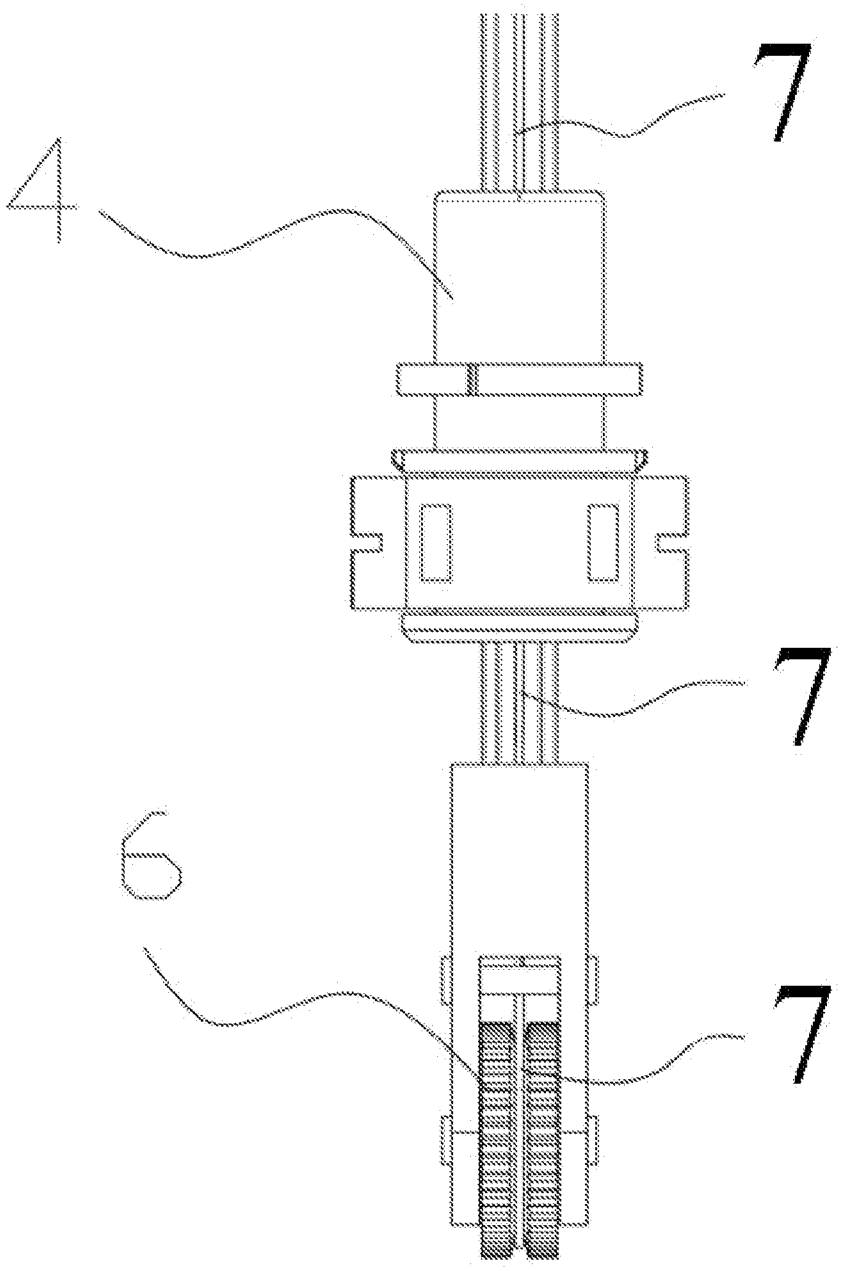
FIG. 4 is a schematic structural view showing a connection between the adjusting rope and a positioning plug adjusting member according to the present application.
Figure 5:
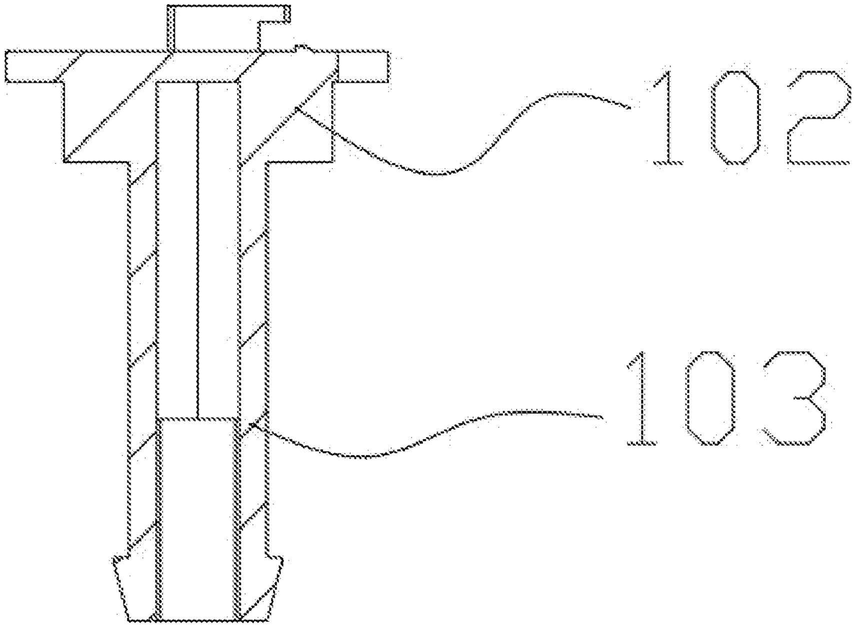
FIG. 5 is a schematic cross-sectional view of a foot-hanging end cover according to the first embodiment of the present application.
Figure 6:
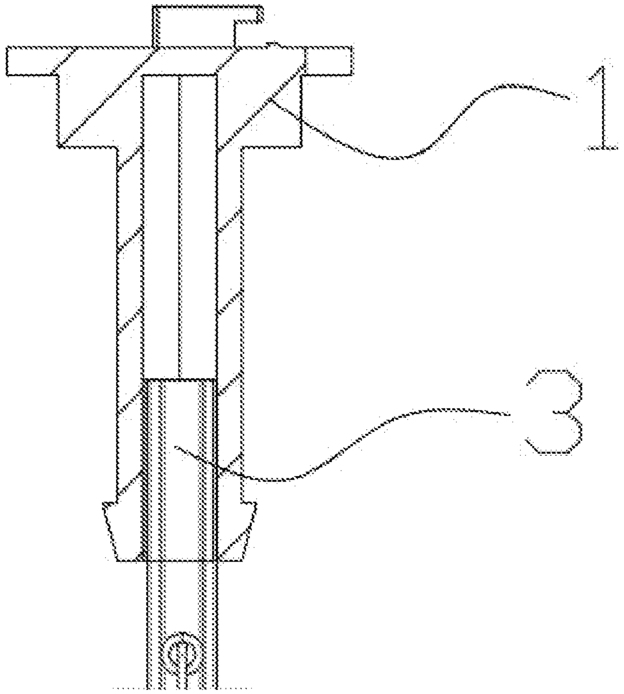
FIG. 6 is a schematic cross-sectional view when the foot-hanging end cover is fitted and connected with the long shaft according to the first embodiment of the present application.
Figure 7:
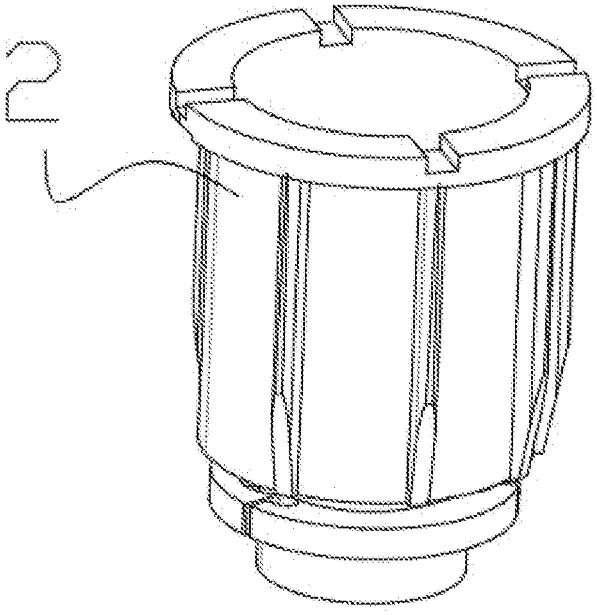
FIG. 7 is a schematic structural view of a spring movable inner sleeve according to the present application.

First embodiment: referring to FIG. 1 to FIG. 7, an adjustable head rail device of a spring assisted cordless roller blind includes a spring 8, a graduated outer tube 9, a long shaft 3 and a brake pull ring 10.

The brake pull ring 10 is made of an elastic material; the brake pull ring 10 is annular, which is easy to pull out, which is convenient for controlling the brake pull ring 10 during use; one side of the brake pull ring 10 is provided with a clamping belt, the clamping belt is arc-shaped and includes a limit belt and a limit block, the number of the limit belt is one, which is arranged in the middle of the clamping belt, and a thickness of the limit belt is larger than a thickness of the clamping belt; the number of the limit blocks is two, and the two limit blocks are respectively arranged at two ends of the clamping belt, and a limit flange is arranged at one end, away from the pull ring, of each limit block, which is used for clamping with other components for fixed connection during working.

The long shaft 3 is made of a rigid material and has the function of supporting and fixing.

A lining positioning plug 5 is movably connected to the long shaft 3, and the lining positioning plug 5 is made of a rigid material, the lining positioning plug 5 is sleeved on the long shaft 3 and is movable on the long shaft 3, and a diameter of the lining positioning plug 5 is slightly smaller than a diameter of the spring 8. In this embodiment, the lining positioning plug 5 serves as a limiting assembly.

One end of the long shaft 3 is fixedly connected with a foot-hanging end cover 1, the foot-hanging end cover 1 includes a foot-hanging end cover head 102 and a foot-hanging end cover rod 103, an open cavity is defined in the foot-hanging end cover rod 103, a size of the cavity is matched with a size of a cross section of the long shaft 3, the foot-hanging end cover 1 is fitted and connected with the long shaft 3 through the cavity, and the long shaft 3 rotates with the rotation of the foot-hanging end cover 1.

The foot-hanging end cover head 102 is fixedly arranged at an upper end of the foot-hanging end cover rod 103, a shape of the foot-hanging end cover head 102 is disc-shaped, and an outer diameter of the foot-hanging end cover head 102 is equal to an outer diameter of the clamping belt; a clamping opening is defined on a side of the foot-hanging end cover head 102, and a size of the clamping opening is the same as a size of the limit belt; a clamping groove is respectively defined on two sides of the clamping opening, and a distance between each clamping groove and the clamping opening is the same as a distance between each limit block and the limit belt. A size of the clamping groove is larger than a size of the limit block. One side, close to the clamping opening, of each clamping groove is provided with a protrusion, so as to be matched and connected with the corresponding limit flange on the limit block; during working, the clamping opening is fitted and connected with the limit belt, the clamping grooves are matched and connected with the limit blocks to fix the foot-hanging end cover 1 to the brake pull ring 10.

A spring movable inner sleeve 2 is sleeved on an outer circumference of the foot-hanging end cover rod 103, and the spring movable inner sleeve 2 is movably connected with the foot-hanging end cover 1. The spring movable inner sleeve 2 is rotatable outside the foot-hanging end cover rod 103, and the foot-hanging end cover 1 does not rotate with the rotation of the spring movable inner sleeve 2. The spring movable inner sleeve 2 is made of a rigid material, an upper surface is ring-shaped, and a diameter of the ring is the same as a diameter of the foot-hanging end cover head 102. Multiple matching grooves are defined on a side of the upper surface of the spring movable inner sleeve 2, and a size of each matching groove is the same as the size of the limit belt. During working, the upper surface of the spring movable inner sleeve 2 abuts against a lower surface of the foot-hanging end cover head 102, and the spring movable inner sleeve 2 is rotatable outside the foot-hanging end cover rod 103 of the foot-hanging end cover 1. The clamping opening of the foot-hanging end cover head 102 is aligned with the matching groove on the spring movable inner sleeve 2, the limit belt of the brake pull ring 10 is fitted and connected with the clamping opening and the clamping groove simultaneously, and then the two limit blocks are respectively matched and connected with the clamping grooves, so that the foot-hanging end cover 1 is fixedly connected with the spring movable inner sleeve 2, and the spring movable inner sleeve 2 cannot rotate outside the foot-hanging end cover 1.

One end, away from the spring movable inner sleeve 2, of the long shaft 3 is fixedly connected with a positioning plug adjusting member 6. The positioning plug adjusting member 6 includes a pulley, and the pulley is rotatable in a direction toward or away from the long shaft 3.

A spring-fixed runner inner sleeve 4 is sleeved on a side, close to the positioning plug adjusting member 6, of the long shaft 3, the spring-fixed runner inner sleeve 4 is made of a rigid material, and the spring-fixed runner inner sleeve 4 is fixedly connected with an outer wall of the long shaft 3, so that the spring-fixed runner inner sleeve 4 cannot rotate relative to the long shaft 3; a rotating outer sleeve is sleeved on an outer circumference of the spring-fixed runner inner sleeve 4, the rotating outer sleeve is movably connected with the spring-fixed runner inner sleeve 4, the rotating outer sleeve does not rotate with the rotation of the spring-fixed runner inner sleeve 4, and the rotating outer sleeve is connected with the roller blind during working, so that the rotating outer sleeve can rotate in the same direction with the roller blind.

A connecting hole is defined on a side, close to the spring movable inner sleeve 2, of the long shaft 3, and an adjusting rope 7 is movably connected in the connecting hole. The connecting hole extends through the long shaft 3, the adjusting rope 7 is movably connected in the connecting hole, and the adjusting rope 7 is connected end to end in a ring shape; a side, close to a fixed end of the spring 8, of the long shaft 3 is connected with the positioning plug adjusting member 6; the adjusting rope 7 is directed through the connecting hole, is arranged along a length direction of the long shaft 3 and is sleeved outside the positioning plug adjusting member 6. The adjusting rope 7 can move with the rotation of the pulley in the same direction with the pulley along the length direction of the long shaft 3.

A lining positioning plug 5 is fixed arranged on the adjusting rope 7. The lining positioning plug 5 is ring-shaped, and an outer diameter of the lining positioning plug 5 is slightly smaller than an inner diameter of the spring 8; a through hole is defined inside the lining positioning plug 5, and the through hole is fixedly connected with the adjusting rope 7, so that the lining positioning plug 5 can move with the movement of the adjusting rope 7; the lining positioning plug 5 is sleeved on the long shaft 3 and is slidably connected with the long shaft 3. The lining positioning plug 5 is slidable on the long shaft 3 controlled by the adjusting rope 7, and a sliding range is between the spring movable inner sleeve 2 and the spring-fixed runner inner sleeve 4.

The spring 8 is sleeved on an outer circumference of the long shaft 3, and is sleeved outside the lining positioning plug 5; one end of the spring 8 is fixedly connected with the spring movable inner sleeve 2, and the other end of the spring 8 is fixedly connected with the spring-fixed runner inner sleeve 4; if the spring movable inner sleeve 2 is rotated, the spring 8 is rotated in a rotation direction of the adjusting member, so as to pre-tighten the spring; if the spring movable inner sleeve 2 is loosened, the spring 8 is reset by the elastic force, and returns to the static state.

Since the outer diameter of the lining positioning plug 5 is slightly smaller than the inner diameter of the spring 8, a portion of the spring 8 that the spring movable inner sleeve 2 drives to rotate is only a portion of the spring 8 between the spring movable inner sleeve 2 and the lining positioning plug 5, that is, a working portion of the spring; the elastic force generated by the reset of the spring with different working lengths after being pre-tightened is also different, so the working length of the spring 8 can be adjusted by controlling a position of the positioning plug adjusting member 6 by the adjusting rope 7 as required: that is, the length of the spring between the spring movable inner sleeve 2 and the lining positioning plug 5 is the working length of the spring 8.

The graduated outer tube 9 is sleeved outside the spring 8, the graduated outer tube 9 is made of a transparent material, and an outer surface of the graduated outer tube 9 is marked with graduations. The zero graduation corresponds to the spring movable inner sleeve 2 and the spring 8, and the graduation number gradually increases towards the spring-fixed runner inner sleeve 4, and a length from the zero graduation to the lining positioning plug 5 is the working length of the spring 8; the spring does not work when the graduation is in the zero graduation; the positioning plug adjusting member 6 can be moved to different graduation s as required during working, so as to control the working length of the spring 8 to be the required working length; the function of the graduation is to move the lining positioning plug 5 with reference to the corresponding setting, so that the adjustable head rail device of the spring assisted cordless roller blind can be used in the roller blind fabrics with different weights and patterns correspondingly.

The working principle is that: before the roller blind is assembled, the user adjusts the adjustable head rail device of the spring assisted cordless roller blind according to the comparison table of the size of the roller blind corresponding to the number of pre-tightening turns of the spring and the working length of the spring provided by the manufacturer; first, the pulley on the positioning plug adjusting member 6 is adjusted according to a width and an area of the roller blind, to control the lining positioning plug 5 to move to the required graduation, and the working length of the spring 8 is the portion between the spring movable inner sleeve 2 and the lining positioning plug 5; the positioning plug adjusting member 6 is rotated so that the lining positioning plug 5 moves towards the spring-fixed runner inner sleeve 4, the working length of the spring 8 in the corresponding table is determined, the foot-hanging end cover 1 is fixed and the spring movable inner sleeve 2 is rotated, so as to control the working portion of the spring 8 to rotate by the same number of turns which can make reference to the table provided by the manufacturer, so that the restoring force generated after the spring 8 is pre-tightened is equal to the gravity of the working portion of the roller blind to be mounted; in this case, the limit belt of the brake pull ring 10 is fitted and connected with the clamping opening and the matching groove simultaneously, the two limit blocks of the brake pull ring 10 are matched and connected with the two clamping grooves in the foot-hanging end cover 1 respectively, so that the spring movable inner sleeve 2 is limited by the brake pull ring 10 and cannot rotate, and the spring 8 is in a pre-tightened state; during working, the foot-hanging end cover 1 is fixed on other mounting member, then the brake pull ring 10 is pulled off, so that the spring movable inner sleeve 2 rotates, and the pre-tightening force of the spring 8 is released, the spring 8 works normally, so that the finished roller blind can be used normally.

The rolled roller blind is assembled with the adjustable head rail device of the spring assisted cordless roller blind; one end of the roller blind is fixed to the spring movable inner sleeve 2, and the other end of the roller blind is fixed to the rotating wheel on the spring-fixed runner inner sleeve 4, and a rotation direction of the head rail device when the roller blind is pulled down is the same as the rotation direction of pre-tightening the spring 8; after the assembly is completed, the brake pull ring 10 is taken out, the gravity of the working portion of the roller blind is equal to the elastic force of the pre-tightened spring 8 to reset; the roller blind is pull down to drive the foot-hanging end cover 1 to rotate, so that the spring 8 rotates in a tighter direction, in this case the gravity of the working roller blind increases, and the elastic force of the spring 8 to reset also becomes larger, the gravity is equal to the elastic force, and the roller blind remains in a static state; when the roller blind is lifted up, the gravity of the working roller blind is reduced, the elastic force of the spring 8 to reset also becomes smaller, the gravity is equal to the elastic force, and the roller blind remains in a static state; therefore, the roller blind can remain stationary whether it is pulled down or lifted up, and there is no need to use a cord for adjustment during work, which is convenient to use.

After the head rail device of the spring assisted cordless roller blind is used for a period of time, the restoring force of the spring 8 becomes smaller due to the long-time deformation of the spring 8. The spring movable inner sleeve 2 can be rotated moderately to change the initial pre-tightening force of the spring 8, so as to control the gravity of the roller blind and the restoring force of the spring to maintain a balance.

It should be noted that when the number of pre-tightened turns of the spring is different, the restoring force generated by the spring is also different. Therefore, the number of the pre-tightened turns of the spring can be adjusted to adapt to the roller blinds of different materials. In addition, the positioning plug adjusting member 6 controls the movement of the lining positioning plug 5 to change the working length of the spring 8, so as to adapt to the roller blinds of different widths. At present, the applicable width of the finished roller blind ranges from 580 mm to 3000 mm, and the applicable area of the finished roller blind ranges from 0.3 $m^2$ to 10 $m^2$, with a wide range of applications.

Figure 8:
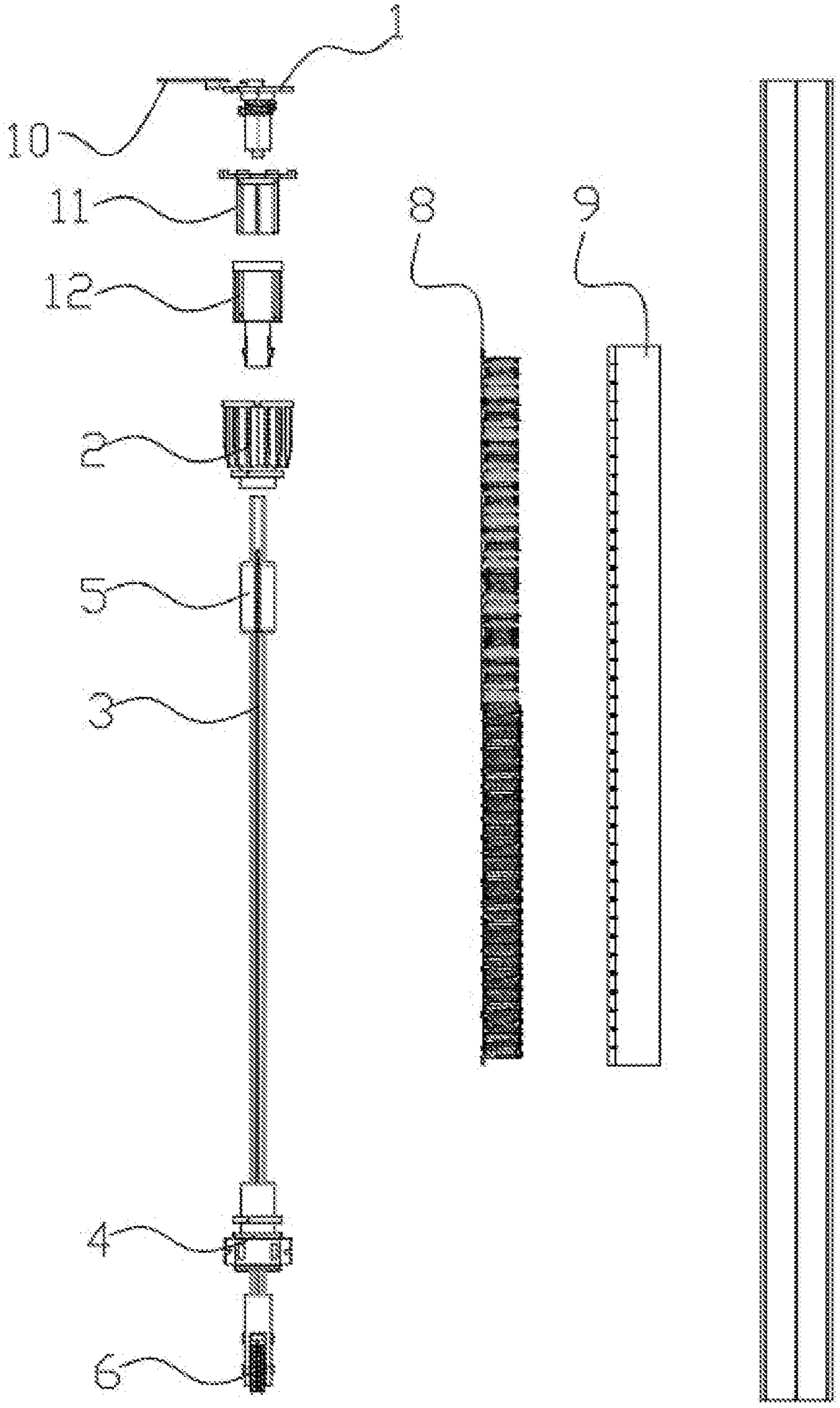
FIG. 8 is a perspective exploded view of a second embodiment of the present application.
Figure 9:
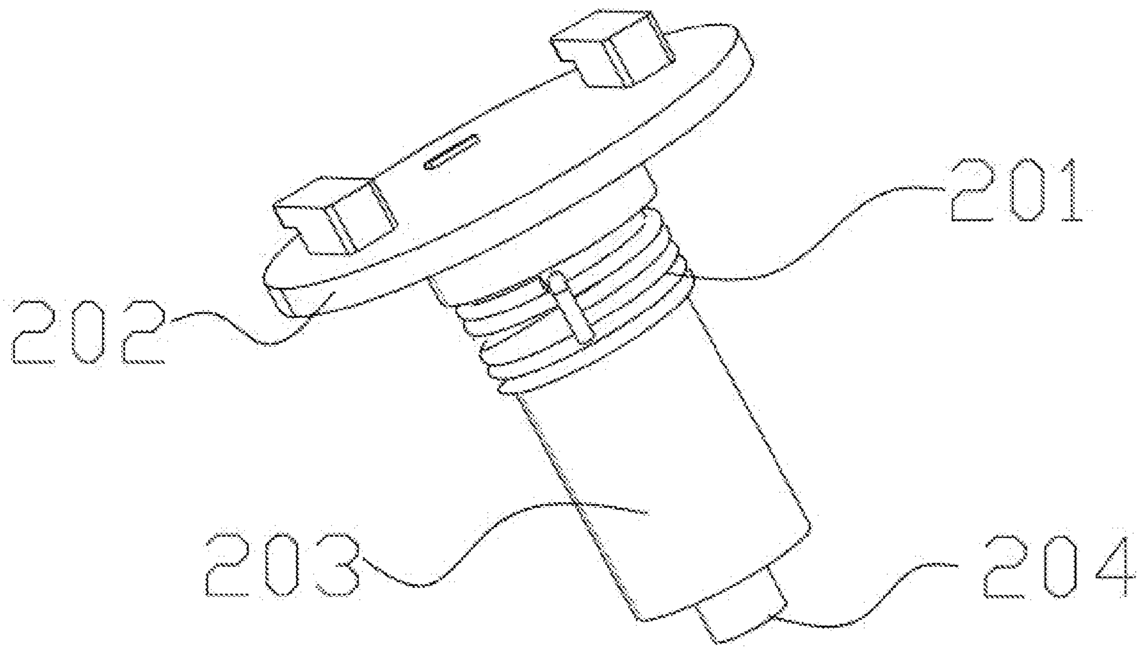
FIG. 9 is a schematic structural diagram of a torsion foot-hanging end cover according to the second embodiment of the present application.
Figure 10:
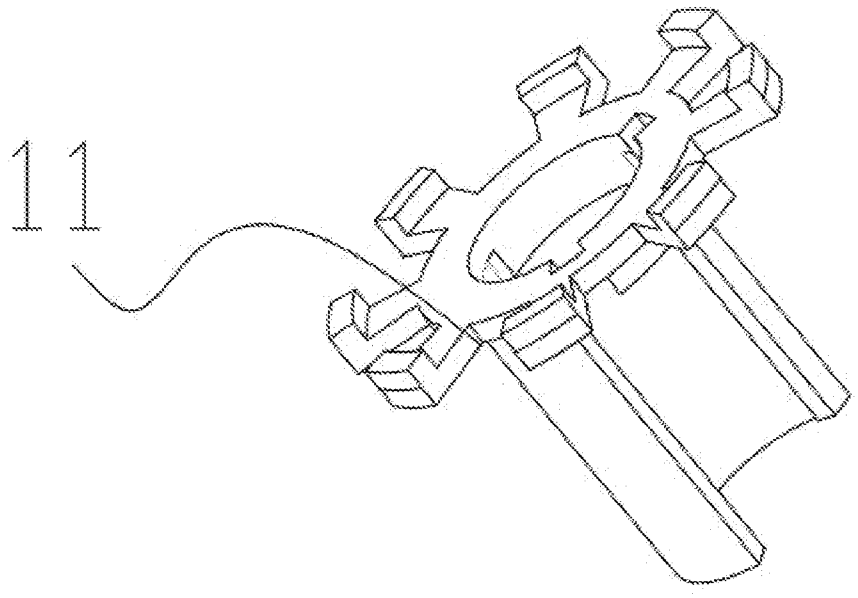
FIG. 10 is a schematic structural view of an active adjusting wheel according to the second embodiment of the present application.
Figure 11:
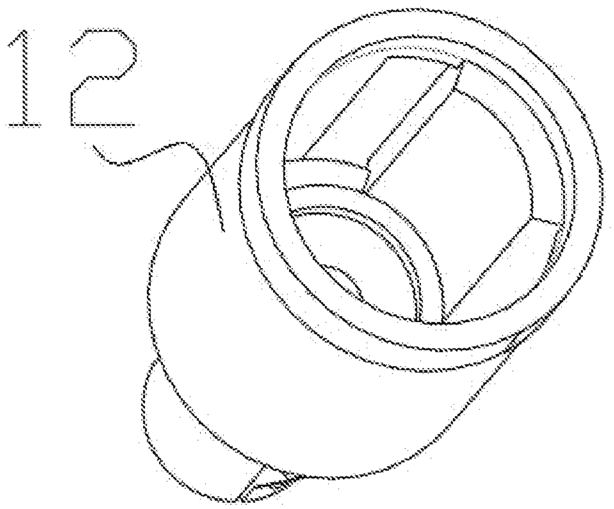
FIG. 11 is a schematic structural view of a passive adjusting wheel according to the second embodiment of the present application.

Second embodiment: different from the first embodiment, referring to FIG. 8 to FIG. 11, an adjustable head rail device of a spring assisted cordless roller blind includes a torque foot-hanging end cover 20, an active adjusting wheel 11 and a passive adjusting wheel 12.

The torque foot-hanging end cover 20 includes a torque foot-hanging end cover head 202, a torque foot-hanging end cover rod 203 and a torque foot-hanging end cover bottom 204, the torque foot-hanging end cover head 202, the torque foot-hanging end cover rod 203 and the torque foot-hanging end cover bottom 204 are integrated to form the torque foot-hanging end cover 20; and the arrangement of the torque foot-hanging end cover head 202 is the same as the arrangement of the foot-hanging end cover head 102 in the first embodiment.

A torsion spring 201 is sleeved on an outer circumference of the torque foot-hanging end cover rod 203, an inner diameter of the torsion spring 201 is smaller than an outer diameter of the torque foot-hanging end cover rod 203, and the torsion spring 201 is tightly connected with the torque foot-hanging end cover rod 203 in an expansion manner.

The active adjusting wheel 11 includes an active adjusting head and an active adjusting rod, the active adjusting head and the active adjusting rod are integrated to form the active adjusting wheel 11, adjusting blocks are evenly provided on an outer circumference of the active adjusting head, an inner diameter of a ring enclosed by the adjusting blocks is slightly larger than an outer diameter of the torque foot-hanging end cover head 202, so that the torque foot-hanging end cover head 202 is inserted in the ring enclosed by the adjusting blocks and moves freely during connection, and each adjusting block can move in a circle around an outer circumference of the torque foot-hanging end cover head 202; the active adjusting rod is an annular cylinder with an open side, an outer diameter of the annular cylinder is slightly larger than the inner diameter of the torsion spring 201; and the foot-hanging end cover sleeved with the torsion spring 201 is inserted into the active adjusting wheel 11 during connection, the torque foot-hanging end cover head 202 is inserted in the ring formed by the adjusting blocks, an outer side of the torsion spring 201 abuts against an inner side of the active adjusting rod, two ends of the torsion spring 201 are fixedly connected to an inner wall of the active adjusting rod; and the torque foot-hanging end cover bottom 204 protrudes out from a lower end of the active adjusting rod and is exposed to a lower side of the active adjusting wheel 11.

The passive adjusting wheel 12 includes an upper passive adjusting wheel and a lower passive adjusting wheel, the upper passive adjusting wheel and the lower passive adjusting wheel are integrated, the upper passive adjusting wheel is cylindrical with an open cavity defined therein, the cavity is cylindrical, a diameter of the cavity is slightly larger than an outer diameter of the active adjusting rod, a height of the cavity is equal to a height of the active adjusting rod; a fan-shaped ring is arranged in the cavity, a size of the fan-shaped ring is equal to a size of an open fan-shaped ring on the side of the active adjusting rod, so that the fan-shaped ring is arranged in the open fan-shaped ring on the side of the active adjusting rod when the active adjusting wheel 11 is matched and connected with the passive adjusting wheel 1, and thus the active adjusting rod pushes the fan-shaped ring to drive the passive adjusting wheel 12 to rotate in a same rotation direction with the active adjusting wheel 11 when the active adjusting wheel 11 is rotated; the lower passive adjusting wheel is fixedly arranged on a lower side of the upper passive adjusting wheel, an open cylindrical cavity is defined in an upper end of the lower passive adjusting wheel, and a diameter of the cavity is slightly larger than an outer diameter of the torque foot-hanging end cover bottom 204, so that the exposed torque foot-hanging end cover bottom 204 tightly abuts against an inner wall of the cavity of the lower passive adjusting wheel during connection; another open cavity is defined in a lower end of the lower passive adjusting wheel, a size of the another cavity is the same as the size of the cross section of the long shaft 3, so that the another cavity can be fitted and connected with the long shaft 3, and thus the long shaft 3 is driven to follow when the passive adjusting wheel 12 rotates.

The spring movable inner sleeve 2 is sleeved on an outer circumference of the passive adjusting wheel 12, and is movably connected with the passive adjusting wheel 12. The rotation of the passive adjusting wheel 12 may not drive the rotation of the spring movable inner sleeve 2.

The working principle is that: the active adjusting wheel 11 is sleeved on an outer circumference of the torque foot-hanging end cover 20 during connection, the torque foot-hanging end cover head 202 is inserted in the ring formed by the adjusting blocks of the active adjusting wheel 11, the outer side of the torsion spring 201 abuts against the inner side of the active adjusting rod, the two ends of the torsion spring 201 are fixedly connected to the inner wall of the active adjusting rod; the torque foot-hanging end cover bottom 204 protrudes out from the lower end of the active adjusting rod; the passive adjusting wheel 12 is sleeved on the outer circumference of the active adjusting wheel 11, and the fan-shaped ring inside the upper passive adjusting wheel is arranged in the open fan-shaped ring on the side of the active adjusting rod; the cavity in the upper end of the lower passive adjusting wheel abuts against the torque foot-hanging end cover bottom 204, and the cavity in the lower end of the lower passive adjusting wheel is fitted and connected with the long shaft 3.

The adjusting member on the upper surface of the torque foot-hanging end cover 20 is rotated to control the torque foot-hanging end cover 20 to rotate by a certain number of turns. Since the torque foot-hanging end cover rod 203 is tightly connected with the torsion spring 201 in the expansion manner, and the torsion spring 201 is fixedly connected with the inner wall of the active adjusting rod, the active adjusting wheel 11 rotates in the same direction with the torque foot-hanging end cover 20. The active adjusting rod pushes the fan-shaped ring to rotate to drive the passive adjusting wheel 12 to rotate in the same direction with the torque foot-hanging end cover 20, so as to drive the long shaft 3 to rotate by the same number of turns in the same direction with the torque foot-hanging end cover 20, and the spring 8 is correspondingly driven to rotate and be pre-tightened; the number of turns can make reference to the table provided by the manufacturer, so that the restoring force generated after the spring 8 is pre-tightened is equal to the gravity of the roller blind to be assembled; the limit belt of the brake pull ring 10 is fitted and connected with the clamping opening and the matching groove simultaneously, the two limit blocks of the brake pull ring 10 are respectively matched and connected with the two clamping grooves in the torque foot-hanging end cover 20, so that the torque foot-hanging end cover 20 is limited by the brake pull ring 10 and cannot rotate, and the spring 8 is in a pre-tightened state.

The rolled roller blind is assembled with the adjustable head rail device of the spring assisted cordless roller blind during use; one end of the roller blind is fixed to the spring movable inner sleeve 2, and the other end of the roller blind is fixed to the movable wheel on the positioning plug adjusting member, and the rotation direction of the head rail device is the same as the rotation direction of pre-tightening the spring 8 when the roller blind is pulled down; after the assembly is completed, the brake pull ring 10 is taken out, the gravity of the working portion of the roller blind is equal to the elastic force of the pre-tightened spring 8 to reset; the gravity of the roller blind is the same as the restoring force of the spring 8 whether the roller blind is pulled down or lifted up, and the roller blind can remain stationary at a position where it stops when it is pulled down or lifted up, and there is no need to adjust with a cord, which is convenient to use.

After the head rail device of the spring assisted cordless roller blind is used for a period of time, the restoring force of the spring 8 becomes smaller due to the long-time deformation of the spring 8, which may cause that the gravity of the roller blind is larger than the restoring force of the spring, thus causing the roller blind to fall down uncontrollably. In this case, the active adjusting wheel 11 can be rotated. Since the torsion spring 101 is fixedly connected with the active adjusting wheel 11, the torsion spring 101 is loosened during rotation, the inner diameter of the torsion spring 101 becomes larger, and the torsion spring 101 is no longer tightly connected with the foot-hanging end cover rod 103 in the expansion manner. Therefore, when the active adjusting wheel 11 is rotated, the foot-hanging end cover 1 remains stationary, and the roller blind does not follow; the active adjusting rod pushes the fan-shaped ring to rotate to drive the passive adjusting wheel 12 to rotate, so that the passive adjusting wheel 12 drives the long shaft 3 to rotate in the direction of pre-tightening the spring 8. After rotation by a certain number of turns, the restoring force of the spring 8 is equal to the gravity of the roller blind again, and the position of the roller blind can be controlled by pulling down or lifting up, which reduces the influence caused by the torsion loss of the spring 8, and prolongs the service life of the head rail device of the spring assisted cordless roller blind.

What is claimed is:

1. An adjustable head rail device of a spring assisted cordless roller blind, comprising a spring (8) and a limiting assembly, wherein the spring (8) is indirectly connected to a roller blind fabric to provide the roller blind fabric with a pulling force that balances a weight of the roller blind fabric;
- wherein the limiting assembly abuts against a middle portion of the spring (8), and the limiting assembly is configured to apply a radial pressure to the spring (8), so that the abutted portion of the spring (8) is transitorily; and
- wherein the limiting assembly is movable in an axial direction of the spring (8) to adjust a position of the abutted portion of the spring (8), wherein a graduated outer tube (9) is sleeved outside the spring (8), wherein the graduated outer tube (9) is made of a transparent material, and an outer surface of the graduated outer tube (9) is marked with graduations that cover a full length of the spring (8).

2. The adjustable head rail device of the spring assisted cordless roller blind according to claim 1, wherein the limiting assembly is located inside the spring (8), and the limiting assembly abuts against an inner wall of the spring (8) to provide a support force for the spring (8).

3. The adjustable head rail device of the spring assisted cordless roller blind according to claim 2, wherein the limiting assembly is made of a rigid material, so that an outer diameter of the limiting assembly is constant; wherein the outer diameter of the limiting assembly is smaller than an inner diameter of the spring (8) in a free state.

4. The adjustable head rail device of the spring assisted cordless roller blind according to claim 1, further comprising a long shaft (3), wherein the long shaft (3) is made of a rigid material; wherein the spring (8) is sleeved outside the long shaft (3); wherein the limiting assembly is sleeved outside the long shaft (3) and is slidably connected with the long shaft (3).

5. The adjustable head rail device of the spring assisted cordless roller blind according to claim 4, wherein a connecting hole is defined on a side, close to a movable end of the spring (8), of the long shaft (3), wherein the connecting hole extends through the long shaft (3), an adjusting rope (7) is movably connected in the connecting hole, and the adjusting rope (7) is connected end to end in a ring shape; wherein a side, close to a fixed end of the spring (8), of the long shaft (3) is provided with a positioning plug adjusting member (6); wherein the adjusting rope (7) is directed through the connecting hole, is arranged along a length direction of the long shaft (3) and is sleeved outside the positioning plug adjusting member (6); wherein the positioning plug adjusting member (6) is configured to control the adjusting rope (7) to be movable along the length of the long shaft (3); wherein the adjusting rope (7) is fixedly connected with the limiting assembly, so that the limiting assembly is indirectly driven by the positioning plug adjusting member (6).

6. The adjustable head rail device of the spring assisted cordless roller blind according to claim 4, wherein a side, movably connected to the spring (8), of the long shaft (3) is connected with a foot-hanging end cover (1), wherein the foot-hanging end cover (1) comprises a foot-hanging end cover head (102) and a foot-hanging end cover rod (103), wherein an open cavity is defined inside the foot-hanging end cover rod (103), wherein a size of the cavity is matched with a size of a cross section of the long shaft (3), so that the foot-hanging end cover rod (103) is fitted and connected with the long shaft (3); wherein a spring movable inner sleeve (2) is sleeved on an outer surface of the foot-hanging end cover head (102), wherein the spring movable inner sleeve (2) is connected with one end of the spring (8), so that the spring (8) is torsionally pre-tightened when the spring movable inner sleeve (2) is rotated; wherein the spring movable inner sleeve (2) is movably connected with the foot-hanging end cover (1), so that the foot-hanging end cover (1) rotates independent of the spring movable inner sleeve (2).

7. The adjustable head rail device of the spring assisted cordless roller blind according to claim 6, further comprising a brake pull ring (10) which is annular; wherein one side of the brake pull ring (10) is provided with a clamping member; wherein a plurality of clamping grooves are defined on an upper surface of the spring movable inner sleeve (2), a size of each clamping groove is the same as a size of the clamping member; wherein a clamping opening is defined on a lower surface of the foot-hanging end cover head (102), wherein a size of the clamping opening is the same as the size of the clamping member, and the clamping opening corresponds to the clamping groove in position, wherein the clamping member is matched and connected with the clamping groove, and the clamping opening is matched and connected with the clamping member to limit a position of the spring movable inner sleeve (2).

8. The adjustable head rail device of the spring assisted cordless roller blind according to claim 1, further comprising a torque adjusting assembly; wherein the torque adjusting assembly is directly or indirectly connected with one end of the spring; wherein the torque adjusting assembly is configured to be rotatable around an axis of the spring (8) to tighten the spring; the torque adjusting assembly is not connected with the roller blind fabric to be independent of the ascending and descending of the roller blind fabric.

9. The adjustable head rail device of the spring assisted cordless roller blind according to claim 8, wherein the torque adjusting assembly comprises a torque foot-hanging end cover (20), an active adjusting wheel (11) and a passive adjusting wheel (12);

wherein a side, movably connected to the spring (8), of the long shaft (3) is connected with the torque foot-hanging end cover (20), wherein the torque foot-hanging end cover (20) comprises a torque foot-hanging end cover head (202), a torque foot-hanging end cover body (203) and a torque foot-hanging end cover rod (204), wherein an open cavity is defined inside the torque foot-hanging end cover rod (204), wherein a size of the cavity is matched with a size of a cross section of the long shaft (3), so that the torque foot-hanging end cover rod (204) is fitted and connected with the long shaft (3);

wherein a torsion spring (201) is mounted on an outer surface of the torque foot-hanging end cover body (203), and is tightly connected with an outer circumference of the torque foot-hanging end cover (20) in an expansion manner;

wherein the active adjusting wheel (11) is sleeved outside the torsion spring (201), and is fixedly connected with two ends of the torsion spring (201), wherein the active adjusting wheel (11) is rotated during working to loosen the torsion spring (201) and separate the torsion spring (201) from the torque foot-hanging end cover (20); and wherein the passive adjusting wheel (12) is sleeved outside the active adjusting wheel (11), and the passive adjusting wheel (12) rotates in a same direction with the rotation of the active adjusting wheel (11); wherein another cavity is defined in a lower end of the passive adjusting wheel (12), wherein a size of the another cavity is the same as the size of the cross section of the long shaft (3), so that the another cavity is fitted and connected with the long shaft (3).

* * * * *